(12) United States Patent
Magdassi et al.

(10) Patent No.: US 7,803,221 B2
(45) Date of Patent: Sep. 28, 2010

(54) INK FOR CERAMIC SURFACES

(75) Inventors: Shlomo Magdassi, Jerusalem (IL); Gera Eron, Tel Mond (IL); Yelena Vinetsky, Jerusalem (IL)

(73) Assignees: DIP Tech LTd.., Kfar Saba (IL); Yissum Research Development Company of the Hebrew University of Jerusalem, Jerusalem (IL)

( * ) Notice: Subject to any disclaimer, the term of this patent is extended or adjusted under 35 U.S.C. 154(b) by 556 days.

(21) Appl. No.: 10/569,496

(22) PCT Filed: Aug. 24, 2004

(86) PCT No.: PCT/IL2004/000771

§ 371 (c)(1),
(2), (4) Date: Feb. 27, 2006

(87) PCT Pub. No.: WO2005/019360

PCT Pub. Date: Mar. 3, 2005

(65) Prior Publication Data

US 2008/0210122 A1   Sep. 4, 2008

Related U.S. Application Data

(60) Provisional application No. 60/497,311, filed on Aug. 25, 2003.

(51) Int. Cl.
C09D 11/00 (2006.01)
C09D 1/00 (2006.01)
C09D 4/00 (2006.01)
C09D 5/00 (2006.01)
C09K 3/00 (2006.01)
C03C 8/00 (2006.01)

(52) U.S. Cl. .................. 106/31.9; 106/31.6; 106/31.65; 106/31.85; 106/31.88; 106/31.95; 501/14

(58) Field of Classification Search ................ 106/31.9, 106/31.95, 31.6, 31.65, 31.85, 31.88; 501/14, 501/65
See application file for complete search history.

(56) References Cited

U.S. PATENT DOCUMENTS

| | | | | | |
|---|---|---|---|---|---|
| 5,269,840 | A | * | 12/1993 | Morris et al. | 106/437 |
| 5,407,474 | A | | 4/1995 | Airey et al. | |
| 5,421,877 | A | * | 6/1995 | Hayakawa et al. | 106/453 |
| 5,743,946 | A | * | 4/1998 | Aoki et al. | 106/31.95 |
| 6,245,138 | B1 | * | 6/2001 | Nyssen et al. | 106/31.86 |
| 6,251,175 | B1 | * | 6/2001 | Zhu et al. | 106/31.58 |
| 6,332,943 | B1 | * | 12/2001 | Herrmann et al. | 156/277 |
| 6,336,723 | B1 | * | 1/2002 | Nicolin | 347/105 |
| 6,346,493 | B1 | * | 2/2002 | Kniajer et al. | 501/17 |
| 6,357,868 | B1 | | 3/2002 | Pfaff et al. | |

(Continued)

FOREIGN PATENT DOCUMENTS

EP   0 774 315 A2   5/1997

(Continued)

*Primary Examiner*—Karl E Group
*Assistant Examiner*—Noah S Wiese
(74) *Attorney, Agent, or Firm*—Pearl Cohen Zedek Latzer, LLP

(57) ABSTRACT

The present invention concerns ink for printing on ceramic surfaces such as glass, which contains glass frits for silica nanoparticles and optionally a pigment, and is suitable for ink jet printing.

43 Claims, 1 Drawing Sheet

U.S. PATENT DOCUMENTS

| | | | |
|---|---|---|---|
| 6,402,823 | B1 | 6/2002 | Sainz et al. |
| 2003/0026957 | A1 | 2/2003 | Tang et al. |

FOREIGN PATENT DOCUMENTS

| | | | |
|---|---|---|---|
| EP | 1 223 201 A | * | 7/2002 |
| EP | 1 223 201 A2 | | 7/2002 |
| EP | 1 223 201 A2 | | 8/2002 |
| EP | 1 614 664 A1 | | 1/2006 |
| EP | 1 840 178 A1 | | 10/2007 |
| ES | 2 220 286 T2 | | 12/2004 |
| FR | 2 735 461 A | | 12/1996 |
| FR | 2 735 461 A1 | | 12/1996 |
| JP | 1-056776 A | | 3/1989 |
| JP | 64-56776 A | | 3/1989 |
| JP | 2-284678 A | | 11/1990 |
| JP | 3-062863 A | | 3/1991 |
| JP | 7-176210 A | | 8/1995 |
| JP | 8-134388 | | 5/1996 |
| JP | 2002 324966 A | | 11/2002 |
| JP | 2002-324966 A | | 11/2002 |
| WO | WO 94/22966 A1 | | 10/1994 |
| WO | 2005/052071 A1 | | 6/2005 |
| WO | 2006/077273 A1 | | 7/2006 |

* cited by examiner

INK FOR CERAMIC SURFACES

FIELD OF THE INVENTION

The present invention concerns ink for printing on ceramic surfaces, especially glass, subsequent to printing the surface undergoes calcining (firing) at temperatures above 600° C.

BACKGROUND OF THE INVENTION

Ceramic materials are hard, brittle, heat- and corrosion-resistant substrates made by shaping and then heating a non-metallic mineral, such as clay, at a high temperature. Enamels, porcelain, and bricks are examples of materials that are produced by molding or shaping minerals and baking or firing them at high temperatures.

Glass products are typically made by fusing silicates with boric oxide, aluminum oxide, or phosphorus pentoxide at high temperatures. They have highly variable mechanical and optical properties and solidify from the molten state without crystallization into a transparent or translucent form. While glass items are generally hard and brittle, their lack of crystalline structure puts them in the class of amorphous solids. Glass items that may require printed graphics include windows, mirrors, cooling utensils, bottles, containers, and more.

From a printing point of view, several methods are available for decorating glass and ceramics with high-quality images. The printing processes used for glass and ceramic printing rely on a variety of ink systems. Other than sublimation inks, most inks fall into one of two families: organic and inorganic.

Organic inks are typically used in screen, inkjet and pad printing, and consist of organic pigments and resins along with other chemistries that cure over time and rely on temperature or some other form of energy to create a bond with the substrate. The most effective organic inks are produced as two-component or two-part systems. These inks generally contain resins capable of polymerization that are blended with catalysts to initiate polymerization. Heating the products to a temperature of approximately 200° C. after printing may accelerate the curing process and improve adhesion. In addition, such heat exposure will typically enhance the mechanical and chemical resistance of the print. After printing, organic ink films will require at least 48 hr to polymerize unless heat is applied.

Inorganic inks use mineral-based pigments and materials that, once printed, have to be heated and melted at high temperatures in order to combine with the substrate surface and form a permanent bond.

Ceramic colors, as inorganic ceramic inks are called, are a mixture of pigments (metal oxides and salts) and finely ground glass particles, called frit. These materials are fused to the substrate by calcining ("firing") them at temperatures between 600-1450° C. Firing temperatures vary depending on the make-up of the color, the nature of substrate, and other application criteria, but in all cases the temperatures must be carefully controlled to achieve specific colors after firing.

These high firing temperatures are used as the components of ceramic colors need to be melted so they can fuse to the ceramic surface on which they are printed. While these inks are typically called "inorganic", they may also contain small amounts of organic material. The organic components are the materials in which the pigment and frit are suspended to create a printing ink. These organic materials, which are oily in nature, are designed to burn off rapidly during firing without affecting print quality and final color.

Inorganic inks come in various forms. These include screen- and pad-printable process-color formulations, thermoplastic varieties, and total-transfer inks. Both the screen-printing and the total-transfer systems are known as "cold color" inks, which mean they do not have to be heated to become printable while the thermoplastic inks must be heated before they can be applied to the substrate.

Thermoplastic ink systems are waxy at room temperature and have to be heated up for printing. For pad printing, the ink trough, plate, and occasionally the pad are kept at a temperature of approximately (60° C.). When the pad carrying the ink comes into contact with the cold object to be printed, the ink cools and sticks to the object.

When screen printing with thermoplastic inks, the mesh is made from stainless steel and an electric current is passed through it. This heats up the screen and melts the ink, which then flows through the mesh and solidifies when it makes contact with the cold ceramic or glass. Controlling current flow is critical because too much will overheat the color and burn out the mesh.

While printing on ceramic surfaces with organic inks may be obtained by silk-screen, pad printing or digital printing, commercial ceramic inks are difficult to use in inkjet printing as they have typically a viscosity higher than required for inkjet printing (about 20-40 cps) and the glass frit contained in them, which is in the micron size range, tends to sediment and also clog the nozzles on the orifice plate from which the ink is jetted during inkjet printing.

It would have been highly desirable to use inkjet printing on the ceramic surfaces with ceramic pigments, instead of the currently used methods of silk-screen, or pad printing. Converting to digital printing can have the following advantages: reduction of costs involved with storage of screens or transfer devices due to digital storing of the desired patterns instead of physical storage; reduction of costs for low value printing which can be prohibitive in silk-screen printing; increase the ease and versatility of switching from one design to another, capacity for edge to edge printing utilization.

Attempts at printing ceramics colors by the inkjet process and hence making the inkjet process available also for decorating ceramic articles, such as glass, enamel and porcelain, have hitherto always failed owing to the pronounced tendency of the specifically heavy and coarse color powders to form sediment. The specific gravity of overglaze and glass colors is from 3.5 to 6.0 kg/l, and the mean fineness of grain of those products is from 3 to 5 μm. Those products settle out from aqueous or alcoholic suspensions having the conventional inkjet processing viscosity within a few seconds to the extent of in some cases 50%. Such suspensions would rapidly lead to blocking of the printing nozzles and of the entire inkjet printing apparatus. Liquid color pastes having a substantially higher viscosity, for example 5000 mPa.s, such as are used in screen printing for decorating glass, will not be suitable for printing by ink jet, since the viscosity is much too high for the ink jet printers present nowadays.

U.S. Pat. No. 6,357,868, incorporated herein by reference, discloses a method for decorating ceramics by inkjet technology using inorganic pigments and glass frit present in a thermoplastic medium having a melting point of at least 30° C. (such as wax). The medium, which is solid under storage conditions, eliminates settling out of the inorganic pigments. The ink is melted just before printing by use of a heatable inkjet print head.

According to this patent sedimentation is eliminated by the use of a thermoplastic medium that solidifies immediately.

EP 1,223,201, incorporated herein by reference, discloses an ink for printing on heat resistant substrates comprising pigment, fusible vitreous agents having particles of less than 10µ and a carrier. The carrier according to this patent is also thermoplastic having a high melting point for phase change of the ink. Such an ink, which is solid under room temperature, needs to be heated prior to printing.

Ink which is solid at room temperatures and has to be heated at the inkjet head prior to printing is awkward to handle, load, and requires special equipment for actual printing. If the ink is liquid at room temperature, it will make the performance and maintenance of the printer much better.

SUMMARY OF THE INVENTION

The present invention concerns an ink composition for printing on a ceramic substrate, to be fused to the substrate upon firing, the ink characterized by:
 (a) having viscosity, below 20 cps at the jetting temperature;
 (b) becoming an integral part of the substrate upon exposure to temperatures above 500° C.;

the ink composition comprising:
 1) a vehicle being liquid at room temperature;
 2) sub-micron particles of a binding composition.

The composition above lacks pigments and thus is not intended to provided a colored printed pattern, Rather the "substrate forming binding composition" (see bellow) which is typically glass frit or silica nano-particles is printed for producing a "non colored pattern" for example to provide the glass with a rough, pattern, an opaque "matt" pattern sometimes desired for aesthetic or functional purposes on glass (such as for avoiding accidental collision of passengers into glass doors).

By a preferred embodiment the ink of the invention comprises also pigments, which maintain their optical properties (color, absorbance etc) even after firing, which produce upon printing a colored pattern.

Thus by a preferred embodiment the present invention provides concerns an ink composition for printing on a ceramic substrate, to be fused to the substrate upon filing, the ink characterized by:
 (a) having viscosity, below 20 cps at the jetting temperature;
 (b) maintaining its optical properties after exposure to temperatures above 500° C.;
 (c) becoming an integral part of the substrate upon exposure to temperatures above 500° C.;

the ink composition comprising:
 1) particles of heat resistant inorganic pigment having an average size of less than 1.2 microns;
 2) a vehicle being liquid at room temperature;
 3) sub-micron particles of a binding composition.

The term "ceramic substrate" refers to inorganic non-metallic substrate processed or used in high temperature. This includes surfaces such as glass for windows of buildings, cars, electrical appliances, such as ovens, etc., ceramic surfaces such as those formed by clay minerals, such as tiles, proclaim, enamel and other ceramic material Preferably, the ceramic substrate is glass.

The ink of the invention is of the type to be fused to the substrate upon firing, so that it becomes an integral part of the substrate, especially glass. The integration may be for the purpose of creating a "non-colored pattern" (opaque or rough pattern) or a "colored pattern".

Integration of the ink to the substrate (glass) to provide a colored pattern may be required for example, in vehicles' windscreens and windows which have a thin painted frame around their upper parts which protects the glue that attaches the window to the car from UV irradiation and decorates the windscreen. Such an ink has to be heat resistant, scratch resistant so that it has to become an integral part of the glass In architecture, many times the windows for internal and external use have to have heat resistant properties for safety reasons, and the decorative patterns present thereon should be an integral part of the windows so as to be durable.

Several electrical appliances, such as windows of microwave ovens, ovens and refrigerators, many times have on them patterns, decorative or functional, which need to demonstrate high temperature durability, typically resistance to temperatures above 600° C. Again such windows need to have the pattern fused with the glass.

Integration of the pigment-less ink into a surface to provide a non-colored pattern may be used especially in architecture to provide rough, opaque or "matt" patterns or surfaces on windows or glass doors both for aesthetic purposes and for avoiding accidental collisions.

Finally, other glass patterns need to show resistance to harsh conditions such as heat, resistance to soaking in warm sulfuric acid, sodium hydroxide solutions, etc. and patterns present thereon such contain a pigment fused to the glass and integral there with.

The ink of the present invention is intended for those purposes.

The ink is characterized by several features. It has a viscosity which enables it to be printed by inkjet printing, typically a viscosity (at room temperature) of below 50 cps, or a viscosity at jetting temperature (the temperature present at the ink printhead during printing) of below 20 cps, most preferably below 15 cps, most preferably between 10-13 cps.

The term "jetting temperature" refers to the temperature of the ink at the print head and is typically 30-60° C., preferably 35-45° C.

The viscosity in the inks described in this invention, is measured by a Brookfield DV-II+ viscometer, with small sample adapter, while using spindle S18, at 80 rpm.

Where the ink also comprises pigment particles for providing a colored pattern the ink should maintain its optical properties after exposure to temperatures of above 500°, preferably after exposures to temperatures above 580°, most preferably after exposure to temperature of above 600°. The "optical properties" it should maintain are selected from color, optical density, UV blockage, gloss, etc. This means that the pigments used according to these embodiments do no loss their optical properties upon firing.

The ink of the present invention becomes an integral part of the substrate when the substrate and the ink are exposed to temperatures above 500°, preferably above 550°, most preferably above 600°. Preferably, the ink of the present invention can become integral with the substrate at temperature bellow 700° as will explained herein bellow.

The term "becoming an integral part" means that the ink is sintered, fused or melted to become inseparable from the upper surface of the ceramic-glass substrate, so that it cannot be scratched off upon conventional physical or chemical abrasion tests, is not separated from the surface upon heating, or exposure to substances such as strong acid solutions.

In the following wherein size of particles are mentioned the number refers to the average size of the particles.

The ink composition according to the "pigment containing" aspect (for producing a colored pattern) of the present invention comprises essentially sub-micron particles of heat resistant inorganic pigment. Preferably, the average size of the inorganic pigments is less than 1.2µ, preferably less than 0.9µ, more preferable less than 0.7µ, most preferably, the average size of the inorganic pigment is bellow 550 nanometers (0.55μ). Preferably, wherein the color of the pigment is white, the average size of the pigment is than between 0.17-0.25μ.

The term "inorganic pigment" refers to a pigment, which is at least partially inorganic. By a preferred embodiment the inorganic pigments are metal oxides, which are a priori present in a form suitable for giving the desired optical properties and do not need to oxidize in situ on the substrate during firing to give these properties. However by other options the pigments may be organometals, which after firing organic parts thereof, is burnt up, and the metallic constituents oxidized to form metal oxides. The organic pigments may also be produced using other compounds comprising metal elements, which upon burning oxidize to form color metal oxide.

Various metal oxides may be used such as chromium oxide, copper oxide, mix oxides $CuCr_2O_3$ oxide (for black color), titanium dioxide (for white color), Red iron oxide (Pigment Red 101), Nickel antimony titanium yellow rutile (Pigment yellow 53), Cobalt Aluminate blue spinel (Pigment blue 28), etc.

The term "heat resistant" in the context of the inorganic pigment refers to the fact that pigment does not completely burn off during the firing process of the substrate (although part of it may be burned off as in organo-metallic composition) and some of its optical properties as described above (color, optical density, UV absorbance, gloss, etc.) are maintained after firing.

The vehicle being liquid at room temperature of 15-28° C. according to one embodiment termed "solvent-based ink", is composed of al least one organic solvent (may be a combination of several organic solvents), and according to another embodiment termed "water based-ink", is composed of a water-based solution.

Finally, ink further comprises sub-micron particles of a compound which is termed "binding composition" this term referring to a composition (may comprise a mixture of several different compounds) which upon firing sinters and fuses to the ceramic (glass) substrate becoming an integral part thereof.

Typically, a binding composition comprises a compound selected from glass frit or silica nanoparticles. Typically, in the final ink formulation, the concentration (w/w) of the solid components (inorganic pigments together with the binding composition-{glass frit silica particles} to the liquid carrier (solvent or water based) is 10 to 60%, preferably 25 to 50% most preferably about 45%.

Typically, the concentration (w/w), in the solid content of the ink (without the vehicle), of the heat resistant inorganic pigment to the binding composition (glass frit/silica nanoparticles) is 1 to 3, preferably 1 to 2.5, most preferably 1 to 2. This ratio depends on the required properties of the fired substrate, such as optical density.

Preferably, the ink further comprises at least one dispersant or/and wetting agent, such as Bykumen (solution of a lower molecular weight unsaturated acidic polycarboxylic acid polyester and White spirit/Isobutanol=2/1), Disperbyk-166 (solution of a high molecular weight block copolymer with pigment affinic groups and Methoxypropylacetate/Butylacetate=1/4), Disperbyk-164 (solution of a high molecular weight block copolymer with pigment affinic groups and Butylacetate), Disperbyk-130 (solution of polyamine amides of unsaturated polycarboxylic acids and Alkylbenzene/Butylglycol=5/1), Disperbyk-182 (solution of a high molecular weight block copolymer with pigment affinic groups and Methoxypropylacetate/Methoxy-proppoxypropanol/Butylacetate=4/4/4), Disperbyk-163 (solution of high molecular weight block copolymer with pigment affinic groups, in xylene/butyl/acetate/methoxypropylacetate 3/1/1); Disperbyk-161 (solution of a high molecular weight block copolymer with pigment affinic groups and Methoxypropylacetate/Butylacetate=6/1), Disperbyk-101 (Solution of a salt of long chain polyamine amides, polar acidic esters and Mineral spirit/Butylglycol 8/1), Disperbyk-160 (solution of a high molecular weight block copolymer with pigment affinic groups and Xylene/Butylacetate=6/1), BYK-P-104 (solution of a lower molecular weight unsaturated polycarboxylic acid polymer and Xylene/Diisobutylketone=9/1), BYK-P-104 S (solution of a lower molecular weight unsaturated polycarboxylic acid polymer with a polysiloxane copolymer and Xylene/Diisobutylketone=9/1), Disperbyk-180 (Alkylolammonium salt of a block copolymer with acidic groups), Disperbyk-110 (solution of a copolymer with acidic groups and Methoxypropyl acetate/Alkylbenzene=1/1), BYK-348 (polyether modified poly-dimethyl-siloxane), BYK-346 (solution of a polyether modified poly-dimethyl-siloxane in Dipropyleneglycol monomethylether), BYK-381 (solution of an polyacrylic copolymer and dipropyleneglycol-monomethylether) (Chemie-BYK, Germany), BYK-306 (solution of a polyether modified poly-dimethyl-siloxane and xylene/monophenylglycol+7/2), BYK-358N (solution of polyacrylate copolymer and alkyl benzenes), BYK-333 (polyether modified poly-dimethyl-siloxane), Tego Dispers 650 (special modified polyether with pigment affinic groups), Tego Dispers 652 (concentrate of a fatty acid derivative), Tego Dispers 710 (solution of a basic urethane copolymer). (TegoChemie Service, Germany), Solsperse 43000 (50% polymeric dispersant in water), Solsperse 40000 (84% polymeric dispersant in water with diethanolamine) (Avecia, UK). Some of these dispersants is suitable for both solvent based and water based inkjet formulations and others for solvent based or water based inks or both.

The ink, in accordance with the invention may comprise additional components, typically selected from wetting agents, dispersing agents, defoamers, humectants, rheology control agents, organic polymers as binders and fixation agents which provide "green strength" (such as polyacrylates or polyvynilpyrrolidone, PVP) anticorrosive agents, coalescent agents, pH control agents and biocides.

Solvent-Based Ink

According to the "solvent-based ink aspect of the invention", the liquid vehicle is organic solvent such as PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPNB (tripropylene glycol mono n-butyl ether), PnP (propylene glycol mono propyl ether), DPnP (dipropylene glycol mono propyl ether), TPNB-H (propylene glycol butyl ether), PMA (propylene glycol mono methyl ether acetate), Dowanol DB (Diethylene glycol mono butyl ether) or other ethylene or propylene glycol ethers (Dow Chemical Company, USA). The vehicle may also be a mixture of two or more different organic solvents.

According to this embodiment, binding compositions are sub-micron particles of a glass frit or glass frit with special additive, which decrease sintering temperature. Such ink is especially useful for printing on a glass substrate. In accordance with the "solvent soluble ink" typically, the size of the particles in the glass frit is less than 0.9μ The glass frits suitable for inkjet have size oh the particles less than 0.7μ or even less than 0.6μ.

The glass frit is typically a glass frit composed of a combination of $SiO_2$, $Bi_2O_3$, and $B_2O_3$, as will be explained in more detail below. Typically, the weight concentration of $SiO_2$ in the glass frit is 50-70% (w/w), and the weight concentration of the $Bi_2O_3$ in the glass frit is 10-20% (w/w), and the weight concentration of the $B_2O_3$ in the glass frit is 3-20% (w/w).

Besides of main compounds such as $SiO_2$, $Bi_2O_3$, and $B_2O_3$, glass frit can contain $Al_2O_3$ (0.5-9%), $K_2O$ (1-2%), $Na_2O$ (2-14%), CaO (1-7%), BaO (15%), PbO (25-60%), $ZrO_2$ (1-2%), ZnO (2-9%), MgO (0.5-1%), $TiO_2$ (5-10%), F (1-2%). The exact composition of the glass frit is selected according to the required properties, such as sintering temperature, acid and base resistance etc.

The solvent based ink may further comprise at least one UV-curable agent. Many times it is desired to fix the ink to the substrate, before the firing so as to improve the printing properties. Addition of UV curable agents enables rapid fixation of the printed pattern by exposing the surface-bearing ink droplets to UV radiation, after printing. Since the UV curable agents are organic molecules, they are burnt out during the firing of the printed glass pattern.

The term "UV-curable agent" refers to a composition that can polymerize upon application of UV irradiation. Typically these are photo-polymerizable monomers or oligomers, together with photoinitiators and/or photosensitizers.

Preferably the solvent based ink composes the glass frit, at least one inorganic pigment, and at least one solvent together with a dispersion agent, More preferably it also composes a wetting agents, and most preferably an organic polymer binder such as PVP or polyacrylates.

Water-Based Inks

According to the "water based ink aspect of the invention" the vehicle is water with various additives, which are used for preparation of water-based inkjet formulations, such as wetting agents, humactants, polymers, cosolvents and/or preservatives.

In accordance with the "water soluble ink" aspect of the present invention, the liquid vehicle is water, and the binding compositions are silica nanoparticles, together with at least one organic binder such as an organic polymer. The purpose of the organic polymer is to cause initial binding of the ink to the substrate, so as to hold the ink in place prior to firing (where the organic polymer is burned off). Organic polymers suitable are those having good water solubility or dispersed in water as submicron particles, and that maintain the viscosity in the proper range, and lead to the initial binding of the printed pattern to the glass substrate.

Such polymers can be PVP (polyvinylpyrrolidone) (Sigma, USA), Joncryl-95 (acrylic colloidal dispersion), Joncryl-142, Joncryl SCX-661 (acrylic polymer emulsions), Joncryl-8003 (hard copolymer emulsion), Joncryl SCX-8082 (30% solution of hard acrylic resin in ammonia), Joncryl-8087 (50% solution of low molecular weight acrylic resin in ammonia and iso-propanol), Joncryl-89 (styrene-acrylic copolymer emulsion) (S.C. Johnson Polymer, The Netherlands).

The term "silica nanoparticles" refers to trade types of silica colloidal particles dispersed on aqueous medium (for example Ludox™ dispersions (DuPont Company, USA).

While silica nanoparticles and organic binders are sufficient for ink forming that can fuse with the substrate upon firing, the actual temperatures needed for such fusion are high. In order to lower the temperatures required to sinter, "fuse" or "melt" silica nanoparticles inorganic water soluble additives should be added to the ink so that sintering can occur at temperature of bellow 700°. Such additives are, compounds enabling optimal binding are compounds containing Boron (B), phosphates, sodium silicates for example Boric acid (May and Baker, England), Sodium Perborate (Aldrich, USA), Sodium Tetraborate decahydrate (BDH, England) or Disodium Octaborate Tetrahydrate (Borax, USA).

It should be noted that both the "solvent based" and the "water based" embodiments may be used without a pigment to provide a non-colored pattern (roughness or opaque/matt pattern) or together with a pigment to provide a colored pattern.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Pigments

Figure 1A:
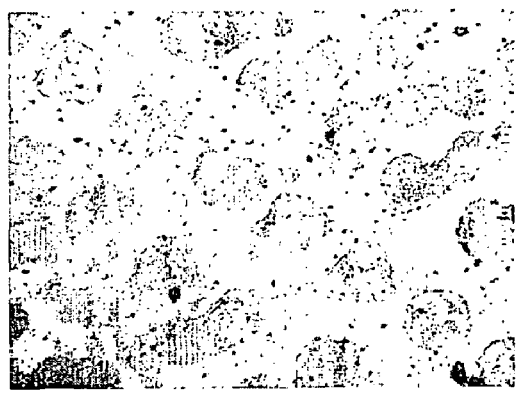
FIG. 1 shows a microscopic picture of solvent/UV-based ink with UV curable agents printed on Spectra Print Head (Spectra, USA) (a) and (b) before and after exposure to UV irradiation, of sample 9, (c) and (da) before and after exposure to UV irradiation of sample 10.

Where the ink of the invention is intended to produce a colored pattern it contains, heat resistant inorganic pigments having an average size of less than 1.2 microns. Although in this invention we describe a black ink, the invention can be easily applied to pigments having other colors. These inorganic pigments can be oxides of metals such as chromium oxide, cupper oxide or mixed oxides $CuCr_2O_3$ (for black color), titanium dioxide (for white color), Red iron oxide (for red color), Nickel antimony titanium yellow rutile (for yellow color), Cobalt aluminum blue spinel (for blue color) etc. An important feature of the pigments, in order to be suitable for ink jet printing, is the requirement of very small size of the pigment. Conventional ceramic pigments, which are currently used for silk screen printing, or pad printing, are in the micrometer size range (as for example those mentioned in EP 1,223,201 that are 10μ), which is unacceptable for ink jet printing. Therefore, the required average pigment size of less than about a micron (more precisely less than about 1.2 microns), preferably less than 0.9μ more preferably, less than 0.7μ, most preferably less than 0.55μ, may be obtained either by milling and grinding the micron size pigments (by suitable instruments such as ball mill, pearl meal, jet mill etc.), or by synthesizing the pigment in conditions yielding sub micron particles (such as solution precipitation, forced hydrolysis, from metal alkoxides, reaction in gas phase etc.). It should be emphasized that in all types of glass ink jet inks described in this invention, the pigment should provide, after printing and firing at high temperature, suitable optical properties, such as optical density, UV blockage, gloss etc.

The pigment may also be an organometallic material, wherein upon firing, the organic constituent burns off and the metallic constituent oxidizes to form metal oxides. Alternatively, the colors may be produced using compounds, which contain metallic elements, which upon burning oxidize to form colored metal oxides. The resulting ink may be of any color, preferably black, cyan, magenta, yellow or white or variation of the above.

Proper selection of the ratio between the pigment and the substrate forming binding composition concentration of the pigment in the ink, and the particle size distribution of the ink can achieve these optical properties.

1. Solvent Based Ink Jet

The binding composition in this ink is a glass frit, milled to yield particles size below 0.7 micrometers. The glass frit composition is selected such that the glass would have sintering temperature below 600° C., and low thermal expansion. The glass frit in accordance with one example comprises: $SiO_2$, $Bi_2O_3$, $B_2O_3$, in a decreasing molar concentration order, and the glass frit is dispersed in an organic solvent (dispersion of the glass frit nanoparticles in a solvent). The exact composition of the frit submicron particles can be tailored according to the required melting temperature, degree of crystallinity, thermal expansion and chemical resistance. Typically, the molar concentration ranges of these components are: 50-70%, 10-20% and 3-20%, respectively.

The sub-micron particles were obtained by wet milling of a micron size frit powder, dispersed in Dowanol DB (Diethylene glycol mono butyl ether-Dow Chemical Company, USA) in the presence of Disperbyk-180 as a dispersing agent. Addition Dowanol DB and dispersant permit improving of the milling and allow to obtain particle size less than 0.9μ without aggregation.

(In the solvent based ink examples the "frit" is the flit dispersion, having a solid content of 65-75% wt).

The pigment in these formulations were also prepared by wet milling of Cr—Cu-oxide micron size pigment, dispersed in Dowanol DB in presence of a dispersant (In the examples the "pigment" is the black pigment dispersion, having solid content of 65-75% wt). The pigment particles were below 0.7 micrometer, while 90% of the particles were below 0.4 micrometer.

The resulting dispersions of the sub micron glass frit and pigments were mixed in such a proportion to yield 3:1 or 2:1 weight ration of frit particles to pigment particles. The dispersion was further diluted with Dowanol DB, and additional solvents (TPM, PMA), and a dispersant is added, to yield low viscosity ink, having 39-50% solids content. In some cases an organic polymer is added, such as PVP or polyacrylate, which allow fixation of the printed pattern, prior to high temperature sintering, thus providing good green strength. This improves the handling of the printed glass.

1.2 Preparation Procedure

Add pigment dispersion, cosolvent (TPM or PMA) and Disperbyk-163™ (Byk-Chemie, Germany) to frit and mix by Dispermat for 5 min after each material addition. Then, add Dowanol DB during mixing and mix again by Dispermat (30 min, 9000 rpm).

The resulting inks were filtered through 1-micrometer filter (Cefar, Switzerland), without clogging the filter, and without significant change in the solids content.

For initial testing, the samples were applied on glass as 5 μl drop and dried in a furnace at 580-650° C. during 10 min.

Further tests were performed by jetting the ink at 35° C., 45° C. or 55° C., (the inks viscosity is about 11 cps at 45° C.). The exact composition and properties of ink jet inks are presented in the following tables.

In general, it was found that the overall performance of the ink in the ink jet print head (Spectra, USA) was very good (jetting, line definition, jetting reliability, no print head clogging), and that the printed patterns has gloss and good optical density after firing at 580-650° C. In some cases the printing was performed on pre-heated glass in order to allow rapid fixation of the ink drops on the glass. The heating continued during and/or in between the whole printing process by an IR heater or warm air or the combination of the two. The printing was performed several times with the same pattern (several layers), in order to obtain patterns having thickness sufficient to meet the final ink requirements such as proper optical density after firing at high temperature.

The chemical resistance was tested by immersion in solutions of sulfuric acid at 80° C., 4 hours, and NaOH solution overnight, and found to be excellent.

Sample 1 was tested for several days while in the print head, and it was found that even after a prolonged shut down, a simple purge and wiping of the orifice plate, led to immediate printing and full performance of the print head.

1.3 Specific Formulations

| Sample Name | Composition | % Solids | Viscosity, at 45° C. | Viscosity, at 55° C. | Surface tension, mN/m | Particle size in composition, nm, by volume, (measured by HPPS instrument, Malvern Instruments Limited, England) |
|---|---|---|---|---|---|---|
| 1 | Frit IJFRIT1D - 57.89 g<br>Pigment IJBLAC2D - 19.3 g<br>TPM - 8.57 g<br>Disperbyk-163 - 0.87 g<br>Dowanol DB - 34.62 g | 46.5 | 11.9 | — | 26.1 ± 0.05 | 100% below 530 nm |
| 2 | Frit JRK617BF - 57.89 g<br>Pigment 2003-12-15 - 19.3 g<br>PMA - 7.72 g<br>Bykumen - 1.13 g<br>Dowanol DB - 25.48 g<br>BYK-306 - 1.13 g | 46.9 | 12.0 | — | 22.6 ± 0.07 | 100% below 520 nm |
| 3 | Frit TEST 1 - 56.6 g<br>Pigment 2004-04-08 - 26.55 g<br>PMA - 8.32 g<br>Bykumen - 2.97 g | 48.9 | 11.5 | — | 27.3 ± 0.1 | 100% below 520 nm |

-continued

| Sample Name | Composition | % Solids | Viscosity, at 45° C. | Viscosity, at 55° C. | Surface tension, mN/m | Particle size in composition, nm, by volume, (measured by (HPPS instrument, Malvern Instruments Limited, England) |
|---|---|---|---|---|---|---|
| 4 | Dowanol DB - 22.87 g<br>BYK-358N - 1.19 g<br>Frit JRK617BF - 53.32 g<br>Pigment 2004-04-08 - 26.66 g<br>TPM - 16.00 g | 51.22 | 12.2 | — | 28.7 ± 0.05 | 100% below 350 nm |
| 5 | Disperbyk-180 - 0.11 g<br>Dowanol DB - 7.12 g<br>Frit TEST 1 - 59.17 g<br>Pigment 2004-04-08 - 27.77 g<br>PMA - 8.70 g<br>Tego 652 - 3.31 g | 44.7 | 11.0 | — | 29.2 ± 0.07 | 100% below 750 nm |
| 6 | Dowanol DB - 33.47 g<br>BYK-333 - 1.34 g<br>Frit JRK617BF - 68.8 g<br>Pigment 2004-04-08 - 34.40 g<br>PMA - 10.32 g<br>Bykumen - 1.56 g<br>Dowanol DB - 39.73 g<br>PVP - 1.56 g | 44.7 | 12.1 | — | 28.5 ± 0.09 | 100% below 320 nm |

1.4 White Glass Ink Jet Ink

The above procedure, used for preparation of black ink can be use, with slight modifications, for white glass ink jet inks preparation. Various types of Kronos Titanium Dioxide as white pigment (achieved from Kronos, USA) were used.

Preparation Procedure

Add cosolvent (TPM or PMA), Dowanol DB and dispersant to frit and mix by Dispermat for 5 min after each material addition. Then, add pigment powder during mixing and mix again by Dispermat (30 min, 9000 rpm).

The resulting inks were filtered through 1-micrometer filter, without clogging the filter, and without significant change in the solids content.

For initial testing, the samples were applied on glass as 5 ul drop and dried in a furnace at 580-650° C. during 10 min.

Further tests were performed by jetting the ink at 45° C. or 55° C., temperature in which the inks viscosities are about 11 cps. The exact composition and properties of two ink jet inks are presented in the following table.

| Sample Name | Composition | % Solids | Viscosity, at 45° C. | Particle size in composition, nm (HPPS, by volume) |
|---|---|---|---|---|
| 7 | Frit TEST 1 - 50.73 g<br>Pigment Kronos 2300 - 17.1 g<br>PMA - 6.79 g<br>Disperbyk-163 - 2.48 g<br>Dowanol DB - 22.38 g | 51.6 | 10.7 | 100% below 750 nm |
| 8 | Frit TEST 1 - 55.50 g<br>Pigment Kronos 2300 - 18.71 g<br>PMA - 7.43 g | 51.6 | 10.9 | 100% below 550 nm |

-continued

| Sample Name | Composition | % Solids | Viscosity, at 45° C. | Particle size in composition, nm (HPPS, by volume) |
|---|---|---|---|---|
| | Disperbyk-110 - 2.71 g<br>Dowanol DB - 24.48 g | | | |

The properties of the sub-micron frit used in the examples of solvent based inks are given in the following table:

Technical Data for Glass Frit IJFRIT1D

| Characteristics | Specification |
|---|---|
| Chemical Composition | Bismuth borosilicate; |
| Glass transition temperature $T_g$ (measured by DSC as inflection point) | (479 ± 5) ° C. |
| Particle size (by number) | $D_{50} = 0.06$ μm<br>$D_{90} = 0.11$ μm |
| Particle size (by volume) | $D_{50} = 0.14$ μm<br>$D_{90} = 0.90$ μm |

Black Pigment IJBLAC2D: The pigment dispersion obtained after the wet milling contains Copper Chromite (70-73%) and Dowanol DB (27-30%).

The difference between various glass frits and pigments, used in the examples of the invention are obtained by milling, and the solids contents and articles size vary from batch to batch. The numbers given are the batch numbers.

All glass frit and pigment batches were received milled from Johnson Matthey B.V. Company. The numbers given are the batch numbers.

1.5 Solvent-Based Ink—with UV Curable Agents

Many times it is desired to fix the ink to the substrate, before the firing so as to improve the printing properties.

Where the ink contains photocurable components, rapid fixation of the printed pattern can be achieved by exposing the ink droplets to UV radiation, after printing. These components cause an increase of the viscosity of the individual droplets, (in some cases a solid droplet is formed although the ink as a whole is still liquid in room temperature, thus providing a fixation of the ink droplet on the glass substrate. Since these additives are organic molecules, they are burnt out during the firing of the printed glass pattern.

At the present invention, the UV curable composition (monomers, oligomers, photoinitiators, photosensitizers) is added to the solvent based ink described above, thus imparting a partial UV curing capability for the ink, which is sufficient to cause fixation of the printed droplets, immediately after exposure to UV light.

Such additives, which can be polymerized upon exposure to UV light, for example: acrylic or vinyl monomer (from Sartomer: SR-504 (ETHOXYLATED (4) NONYL PHENOL ACRYLATE), SR-355 (DITRIMETHYLOLPROPANE TETRAACRYLATE), SR-454 (ETHOXYLATED (3) TRI-METHYLOLPROPANE TRIACRYLATE), SR-9036 (ETHOXYLATED (30) BISPHENOL A DIMETHACRYLATE), SR-399 (DIPENTAERYTHRITOL PENTAACRYLATE), SR-9016 (METALLIC DIACRYLATE), SR-351 (TRIMETHYLOLPROPANE TRIACRYLATE), SR-423 (ISOBORNYL METHACRYLATE), CD-550 (METHOXY POLYETHYLENE GLYCOL (350) MONOMETHACRYLATE), SR-252 (POLYETHYLENE GLYCOL (600) DIMETHACRYLATE), SR-203 (TETRAHYDROFURFURYL METHACRYLATE) and photoinitiators, such as Darocur-4265 (50% 2-Hydroxy-2-methyl-1-phenyl-1-propanone and 50% Diphenyl (2,4,6-tethylbenzoyl)-Phosphine (MAPO) phosphine oxide), Darocur-TPO (Diphenyl (2,4,6-trimethylbenzoyl)-Phosphine (MAPO) phosphine oxide), Irgacure-907 (2-Methyl-1-[4-(methylthio)phenyl]-2-(4-morpholinyl)-1-propanone), Irgacure-369 (Benzyl-2-(dimethylamino)-1-[4-(4-morpholinyl) phenyl]-1-butanone, Irgacure-184 (1-Hydroxy-cyclohexyl-phenyl-ketone), Irgacure-819 (Phosphine oxide, phenyl b is 1(2,4,6-trimethyl benzoyl), (Ciba, Basel), Speedcure ITX (Isopropyl-9H-thioxanthen-9-one, 97%, mixture of 2- and 4-isomers) (Aldrich, USA).

Preparation Procedure

Add monomer and photoinitiators directly to the solvent based glass ink as prepared above, and mix by stirrer till full additives dissolution. Slight heating can be used for dissolution acceleration.

A similar ink will be obtained by adding the monomer and photoinitiators to solvent of the ink, Dowanol DB and mix by stirrer till full additives dissolution. Then, the pigment, frit, cosolvent (TPM or PMA) and dispersant are added and mixed by Dispermat for 5 min after each material addition. Then, add Dowanol DB, which contain the UV additives and mix again by Dispermat (30 min, 9000 rpm).

The resulting inks were filtered through 1-micrometer filter, without clogging the filter, and without significant change in the solids content.

For initial testing, the samples were applied on glass as 5 ul drop and immediately exposed to UV light (Cure spot, Adas Technologies) for 30 seconds thus causing rapid fixation of the drop on the glass substrate. The final firing was carried out in a furnace at 580-650° C. during 10 min.

Further tests were performed by jetting the ink at 45° C. or 55° C., a temperature in which the inks viscosities are about 11 cps. The exact composition and properties of ink jet inks are presented in the following table.

| Sample Name | Composition | % Solids | Viscosity, at 45° C. |
|---|---|---|---|
| Sample 9 | Frit JRK617BF - 50.92 g<br>Pigment 2004-12-11 - 17.0 g<br>TPM - 13.6 g<br>Dowanol DB - 8.16 g<br>Disperbyk-180 - 0.91 g<br>Byk-306 - 0.91 g<br>Irgacure 819 - 1.5 g<br>Irgacure 907 - 0.0375 g<br>Speedcure ITX - 1.0 G<br>SR 355 - 6.0 g | 45.3 | 10.6 |
| Sample 10 | Frit JRK617BF - 44.71 g<br>Pigment 2004-12-11 - 14.9 g<br>PMA - 5.96 g<br>Dowanol DB - 19.67 g<br>Bykumen - 0.88 g<br>Byk-306 - N 0.88 g<br>Irgacure 819 - 3.0 g<br>Speedcure ITX - 2.0 g<br>SR 355 - 6.0 g<br>CN 381 - 2.0 g | 39.8 | 11.1 |
| Sample 11 | Frit TEST 1 - 37.61 g<br>Pigment 2004-12-11 - 12.54 g<br>PMA - 5.01 g<br>Dowanol DB - 16.55 g<br>Bykumen - 0.73 g<br>Byk-358N - N 0.73 g<br>Irgacure 819 - 1.2 g<br>Irgacure 907 - 0.03 g<br>Speedcure ITX - 0.8 g<br>SR 355 - 4.8 g | 43.0 | 10.6 |

The chemical resistance was tested by immersion in solutions of sulfuric acid at 80° C., 4 hours, and NaOH solution overnight, and found to be excellent.

It was found that the printed droplets were much smaller and have a higher optical density, while the ink contains the UV additives, and UV curing was performed immediately after printing.

Figure 1B:
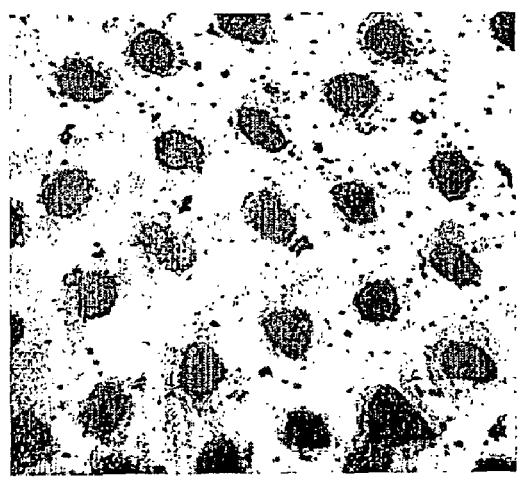
Figure 1C:
Figure 1D:

FIG. 1(a) and FIG. 1(b) show microscopic imaging of ink droplets of Sample 9 without and with curing and FIG. 1(c) and FIG. 1(d) show microscopic imaging of ink droplets of Sample 10 without and with curing. As can be seen all parameters of the droplets such as smaller, spherical spots, defined edges with higher optical density are obtained when the printed pattern is exposed to UV light right after printing indicative of good fixation to the substrate were better in the UV curable sample as compared to the control.

2. Water Based Glass Ink Let Ink 2.1 General

This type of ink contains as the liquid vehicle, mostly water, and as the binding composition, a mixture of glass forming material and an organic polymer. The glass forming material described in this invention is based on silica nanoparticles (size below 60 nanometers), water soluble materials which cause a reduction in the sintering temperature of the silica nanoparticles, and organic binders which lead to initial binding to the glass substrate These compositions cause a significant decrease in the sintering temperature of the silica, thus allowing good adhesion and glass formation by the silica particles, at as low temperatures as 580° C. It should be noted that the melting point of large particles of Silica is about 1700° C., a temperature which would not allow it's use as a binder on glass substrates, because the glass will not be solid at that temperature. Therefore there is a need to use silica in the form of nanoparticles, which in presence of suitable additives would be able to sinter and bind to the glass temperature, at temperature lower than 1700° C. The possible use of the silica nanoparticles overcomes the need for frit milling in order to obtain the required size of the glass forming materials. The present invention thus provides a simple method and compositions to prepare low viscosity, heat and chemicals resistant glass inks, having only water-soluble materials together with nanoparticles and organic polymers. This type of inks is especially suitable for ink jet printing, due to the very low viscosity and small size of the particles.

2.2 Preparation Procedure—General

The process for preparation of the water based ink is very simple: only mixing of the components is required in order to obtain homogenous, stable inks.

More specifically, the glass forming binder is based on commercially available silica dispersions, such as the Ludox™, produced by Du Pont. Ludox is the trade name silica nanoparticles dispersed in water medium (DuPont, USA). Ludox dispersions contain 30-50% of silica nanoparticles with size is between 7 and 22 nm. There are anionic or cationic, modified or non-modified silica particles with or without polymeric stabilizers It was found, in general, that by applying the Ludox™ dispersions on glass, followed by firing at temperatures below 650° C., all Ludox™ dispersions, which were tested, did not form a glassy film on the glass substrate, and there was no adhesion to the glass substrate and could easily peeled of although probably at higher sintering temperature integrating would have been achieved. It was therefore obvious that the sintering temperature of the silica nanoparticles should be lowered.

It accordance with the invention it was found that it is possible to dissolve in the Ludox™ dispersion specific electrolytes, which, in presence of organic polymers, could strongly bound to a glass surface, giving an acid and base chemical resistance.

The organic polymers (water soluble or colloidal system) such as PVP (Polyvinyl pirrolidone, MW=10,000, Sigma, USA), or various types of styrene or acrylic latexes, Johnson Polymers, Netherlands) and the water soluble inorganic additives should be carefully selected, in order to obtain optimal performance of the glass binder. Compound enabling optimal binding are compounds containing Boron (B), phosphates, sodium silicates, etc. More specifically, we found that sodium perborate, sodium perborate with boric acid, aluminium phosphate, Disodium Octaborate Tetrahydrate ("polybor", Borax, USA) are capable of reducing the sintering temperature of silica nanoparticles and enhancing their adhesion and fusion with the glass substrate. All these compositions yielded low viscosity liquids, without gel formation or phase separation for prolonged time. These findings made the compositions containing them, very suitable to be used as new binders for glass-ink jet ink. Therefore, we were able to use such compositions as the binder component in the water based glass inkjet ink.

2.3 Water Based Formulations 2.3.1 Formulation with Joncryl-95 (5.1% $SiO_2$ as Solids) without Pigment

| | Wt. of solution, g | Wt. of solid in the solution, g |
|---|---|---|
| Ludox TMA | 1.00 | 0.34 |
| Sodium perborate tetrahydrate (1.6%) sol. | 4.03 | 0.065 |
| Joncryl-95 (full) | 0.28 | 0.084 |
| Glycerol | 0.33 | 0.33 |
| Dowanol DB (full) | 1.00 | 1.00 |
| BYK-348 (full) | 0.0053 | 0.0053 |

2.3.2 Formulation with PVP (4.99% $SiO_2$ as Solids) without Pigment

| | Wt. of solution, g | Wt. of solid in the solution, g |
|---|---|---|
| Ludox TMA | 1.00 | 0.34 |
| Sodium perborate tetrahydrate (1.6%) sol. | 3.62 | 0.058 |
| PVP (30%) sol. | 0.83 | 0.25 |
| Glycerol | 0.34 | 0.34 |
| Dowanol DB | 1.02 | 1.02 |
| BYK-348 | 0.0068 | 0.0068 |

Preparation Procedure:

Add Joncryl-95 (Johnson Polymer, The Netherlands) or PVP to Sodium perborate solution and mix by stirrer for 5 min. Then, add Glycerol (J. T. Baker, USA), Dowanol DB and Ludox solution with mixing (5 min) after each addition. The BYK-348 is added last and mix again (5 min).

2.3.3 Formulation with PVP and Aluminum Phosphate (9.2% $SiO_2$ as Solids) without Pigment

| | Wt. of solution, g | Wt. of solid in the solution, g |
|---|---|---|
| Ludox TMA | 1.00 | 0.34 |
| PVP (15.0%) sol. | 1.67 | 0.25 |
| Aluminium Phosphate sol. | 0.30 | 0.15 |
| Glycerol | 0.37 | 0.37 |
| Dowanol DB | 0.37 | 0.37 |
| BYK-348 | 0.0037 | 0.0037 |

Preparation Procedure:

Add Glycerol and Dowanol DB to PVP solution and mix by stirrer for 5 min after each material addition. Then, add Ludox and mix again (5 min). The Aluminum Phosphate solution (Johnson Matthey, The Netherlands) was added after Ludox while stirring. The BYK-348 is added last and mix again (5 min). It should be noted that these "pigment-less" formulations can be used to produce a non-colored pattern (roughness, opaque, matt pattern).

2.3.4 Formulation with Joncryl and Boric Acid (12.7% SiO$_2$ as Solids) without Pigment

|  | Wt. of solution, g | Wt. Of solid in the solution, g |
| --- | --- | --- |
| Ludox TMA | 1.00 | 0.34 |
| Sodium perborate tetrahydrate (1.6%) sol. | 1.00 | 0.016 |
| Boric acid | 0.24 | 0.024 |
| Joncryl-95 | 0.28 | 0.084 |
| Glycerol | 0.17 | 0.17 |
| Dowanol DB | 0.52 | 0.52 |
| BYK-348 | 0.0034 | 0.0034 |

2.3.5 Formulation with Polybor (14.4% SiO$_2$ as Solids) without Pigment

|  | Wt. of solution, g | Wt. of solid in the solution, g |
| --- | --- | --- |
| Ludox AM 30 | 12 | 3.6 |
| Disodium Octaborate Tetrahydrate (Polybor) (15%) sol. | 1.8 | 0.27 |
| Glycerol | 5 | 5 |
| 1 methyl 2-pyrrolidone | 1 | 1 |

Preparation Procedure:

Add Glycerol to Disodium Octaborate Tetrahydrate solution and mix by stirrer for 5 min. Then, add Ludox mix again (5 min), add 1 methyl 2-pyrrolidone (Aldrich USA) and mix for 5 min.

2.3.6 Testing:

All samples were applied on glass as a 5 ul drop and fired in a furnace at 580-650° C. during 10 min. The resulting coating was scratch resistant, and withstands soaking in acid and base, in a testing procedure similar to that of the solvent based frit glass inks described earlier.

In addition, the sample was filtered through 0.45 um filter, and then was printed by a Lexmark z602 printer. The resulting pattern had good adhesion to glass slide, after heating at 580 C for 10 minutes.

2.4 Addition of Pigment

Once having the aqueous glass binders, it was possible to prepare glass ink jet inks, simply by mixing pigments or a pigment dispersion with the glass forming binder. It should be emphasized that the glass aqueous binder is composed, according to the present invention, of silica nanoparticles, water, inorganic additives which reduce sintering temperature of the silica nanoparticles, and optionally an organic binder which provides the initial binding at low temperature.

2.4.1 Formulation (with 15% Wt Pigment from Formulation) with Joncryl-95 (Organic Binder) (4.1% SiO$_2$ as Solids)

2.4.1 Formulation (with 15% Wt Pigment from Formulation) with Joncryl-95 (Organic Binder) (4.1% SiO$_2$ as Solids)

|  | Wt. of solution, g | Wt. of solid in the solution, g |
| --- | --- | --- |
| Ludox TMA | 1.00 | 0.34 |
| Sodium perborate tetrahydrate (1.6%) sol. | 4.03 | 0.065 |
| Joncryl-95 | 0.28 | 0.084 |
| Glycerol | 0.33 | 0.33 |
| Dowanol DB | 1.00 | 1.00 |
| BYK-348 (full) | 0.0053 | 0.0053 |
| Pigment IJBLAC1J Or Pigment IJBLAC2D Or white pigment such as Kronos 2300 | 1.6 | 1.17 |

This formulation has a viscosity below 10 cps and surface tension below 40 dynes/cm at room temperature, making it an excellent candidate for ink jet printing. A unique and surprising feature of this ink is it's high chemical and scratch resistance, in spite the fact that the glass to pigment ratio is much lower than conventional paint and ink systems (in conventional glass ink for silk printing this ratio is 3:1, while in this ink the ratio is the opposite, 1:3.6. Obviously, the pigment/silica ratio can be tailored according to the requirements of the final printed pattern. In addition, the silica nanoparticles are commercially available as not expensive dispersions, ready for use, without the need of further reduction of their particles size. Nowadays, particles with a size below 300 nm are suitable for ink jet printers, and it's known that the lower the particle' size the better ink performance. The particles used in our invention are much smaller, in the size range of 7 to 22 nm.

2.4.2 Formulation with Joncryl-95 and Boric Acid (with 15% Wt Pigment from Formulation) (9.6% SiO$_2$ as Solids)

|  | Wt. of solution, g | Wt. of solid in the solution, g |
| --- | --- | --- |
| Ludox TMA | 1.00 | 0.34 |
| Sodium perborate tetrahydrate (1.6%) sol. | 1.00 | 0.016 |
| Boric acid | 0.024 | 0.024 |
| Joncryl-95 | 0.28 | 0.084 |
| Glycerol | 0.17 | 0.17 |
| Dowanol DB | 0.52 | 0.52 |
| BYK-348 | 0.0034 | 0.0034 |
| Pigment IJBLAC2D | 0.83 | 0.6 |

2.4.3 Porous Glass Forming Water-Based Ink

Based on our findings it appears that it is also possible to combine the Ludox type systems with water glass solutions, or even use water glass solutions only, and obtain interesting features of the ink after firing. For example, one may obtain a porous, semi-transparent printed glass pattern, by using the following ink compositions based on water glass:

2.5 Na-Silicate Based Formulations of Formulation without Pigment (9.6% SiO$_2$ as Solids)

|  | Wt. of solution, g | Wt. of solid in the solution, g |
| --- | --- | --- |
| Sodium silicate solution | 9.99 | 2.50 |
| Glycerol | 2.5 | 2.5 |
| BYK-348 | 0.013 | 0.013 |

2.5.1 Formulation with 15% Wt Pigment from Formulation (17.0% SiO$_2$ as Solids)

| | Wt. of solution, g | Wt. of solid in the solution, g |
|---|---|---|
| Sodium silicate solution RM.632 | 9.99 | 2.50 |
| Glycerol | 2.5 | 2.5 |
| BYK-348 | 0.013 | 0.013 |
| Pigment RM.658 UV | 2.21 | 2.21 |

Procedure:

Add Glycerol and BYK-348 to Sodium silicate solution (Johnson Matthey, Netherlands) and mix by stirrer for 5 min after each material addition. Then, add pigment RM.658 UV (Johnson Matthey, Netherlands) and mix again by Dispermat (15 min, 9000 rpm).

This low viscosity sample was applied on glass as 5 ul drop and dried in a furnace at 580-650° C. during 10 min., and gave a porosive coating, which was strongly adhered to the glass substrate.

The invention claimed is:

1. An ink composition for printing on a glass substrate, to be fused to the substrate upon firing, the ink characterized by:
   (a) having viscosity, below 20_cps at jetting temperature and having 39-50wt % solids content; and
   (b) becoming an integral part of the substrate upon exposure to temperatures above 500° C. and below 700° C.;
   the ink composition comprising :
      1) a vehicle being a liquid at 15° C.; and
      2) sub-micron particles of binding composition.

2. The ink composition according to claim 1, the ink further characterized by:
   (c) maintaining optical properties after exposure to temperatures above 500° C.;
   the ink composition further comprising:
      3) particles of heat resistant inorganic pigment having an average size of less than 1.2microns.

3. The ink composition of claim 2 wherein the heat resistant inorganic pigments are metal oxides.

4. The ink composition of claim 2, wherein the particles of inorganic pigment have an average size less than 0.9microns.

5. The ink composition of claim 4, wherein the average size of the particles of the inorganic pigment is less than 0.7microns.

6. The ink composition of claim 5, wherein the average size of the particles of the inorganic pigment is less than 0.55microns.

7. The ink composition of claim 2 wherein the inorganic pigments are selected from the group consisting of chromium oxide, copper oxide, titanium oxide, Cu-Cr$_2$O$_3$oxides, titanium dioxide, iron oxide, nickel antimony titanium yellow rutile, cobalt aluminum blue spinel, and combinations of two or more of the above.

8. The ink composition of claim 1 wherein the liquid vehicle is at least one organic solvent.

9. The ink composition according to claim 8 wherein the at least one organic solvent is selected from the group consisting of PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPnB (tripropylene glycol mono n-butyl ether), PnP (propylene glycol mono propyl ether), DPnP (dipropylene glycol mono propyl ether), TPnB-H (propylene glycol butyl ether), PMA (propylene glycol mono methyl ether acetate), Dowanol DB (diethylene glycol mono butyl ether) and other ethylene or propylene glycol ethers; or a combination of two or more of the above.

10. The ink composition of claim 8 wherein the binding composition comprises sub-micron particles of glass frit.

11. The ink composition of claim 10 wherein the glass frit is composed of SiO$_2$, Bi$_2$O$_3$, and B$_2$O$_3$.

12. The ink composition of claim 1 wherein the w/w of the SiO$_2$ in the glass frit is 50-70%.

13. The ink composition of claim 11 wherein the w/w of the Bi$_2$O$_3$ in the glass frit is 10-20%.

14. The ink composition of claim 11 wherein the w/w of the B$_2$O$_3$ in the glass frit is 3-20%.

15. The ink composition of claim 8 further comprising at least one dispersant, or a combination of dispersants.

16. The ink composition of claim 8 further comprising at least one wetting agent.

17. The ink compositions according to claim 8 further comprising an organic polymeric binder.

18. The ink composition of claim 17 wherein the organic polymeric binder is a polyacrylate or polyvinylpyrrolidone (PVP).

19. The ink composition of claim 8 further comprising at least one UV-curable agent.

20. The ink composition according to claim 19 wherein the ink curable agent is selected from the group consisting of photo polymerizable monomers and photo-polymerizable oligomers.

21. The ink according to claim 20 further comprising at least one photoinitiator or photosensitizer.

22. The ink composition of claim 1 wherein the liquid vehicle is water-based.

23. The ink composition of claim 22 wherein the binding composition comprises aqueous dispersion of silica nanoparticles.

24. The ink composition of claim 23 further comprising an organic polymer.

25. The ink composition of claim 22 comprising at least one water soluble agent for decreasing the sintering temperature of the sub-micron particles of binding composition.

26. The ink composition of claim 25 wherein the sintering temperature is decreased to a temperature below 700° C.

27. The ink composition of claim 25 wherein the water soluble agent is selected from the group consisting of boron (B) containing agents, phosphate containing agents, bismuth containing agents, and sodium silicate containing agents, or combinations of the above.

28. The ink composition of claim 27 wherein the water soluble agent is selected from the group consisting of boric acid, sodium perborate, sodium tetraborate decahydrate and disodium octaborate tetrahydrate.

29. The ink composition of claim 24 wherein the organic polymers are water soluble or water dispersible organic polymers.

30. The ink composition of claim 29, wherein the organic polymer is selected from the group consisting of PVP (polyvinylpyrrolidone), acrylic colloidal dispersion, acrylic polymer emulsions, styrene-acrylic copolymer emulsion, and combinations of the above.

31. The ink composition of claim 24 wherein the organic polymers are a colloidal system.

32. An ink composition according to claim 1 further comprising at least one additive.

33. An ink composition according to claim 32 wherein the additive is selected from the group consisting of wetting agents, dispersing agents, defoamers, humectants, rheology control agents, organic polymers as binders and fixation agents, anticorrosive agents, coalescent agents, pH control agents and biocides.

34. An ink composition according to claim 33 wherein the organic polymers as binders and fixation agents are polyacrylates or polyvinylpyrrolidone (PVP).

35. An ink composition for printing on a ceramic substrate, to be fused to the substrate upon firing, the ink characterized by:
  (a) having viscosity, below 20_cps at jetting temperature and having 39-50wt % solids content; and
  (b) becoming an integral part of the substrate upon exposure to temperatures above 500° C.;
the ink composition comprising:
  1) a vehicle being a 15° C. room temperature and comprising at least one organic solvent selected from the group consisting of PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPnB (tripropylene glycol mono n-butyl ether), PnP (propylene glycol mono propyl ether), DPnP (dipropylene glycol mono propyl ether), TPnB-H (propylene glycol butyl ether), PMA (propylene glycol mono methyl ether acetate), Dowanol DB (diethylene glycol mono butyl ether), other ethylene or propylene glycol ethers, and a combination of two or more of the above listed solvents; and
  2) sub-micron particles of binding composition.

36. A method of printing on a ceramic substrate, the method comprising:
  (a) preparing an ink composition which is liquid at room temperature, the ink composition having 39-50wt % solids content, comprising a vehicle that is liquid at 15° C. and sub-micron particles of binding composition;
  (b) applying the ink to the ceramic substrate at a viscosity below 20_cps; and
  (c) firing the substrate at a temperature above 500° C. so that the sub-micron particles become an integral part of the substrate.

37. A method of printing on a glass substrate, comprising:
  ink jet printing a composition according to claim 1 onto the glass substrate to produce a pattern;
  fixing the pattern to the substrate by application of energy; and firing said substrate at said temperature above 500° C. and below 700° C.

38. A method according to claim 37, wherein said energy is applied as heat energy.

39. A method according to claim 38, wherein said heat energy is provided as infrared (IR) radiation.

40. A method according to claim 38, wherein said heat energy is provided as warm air.

41. A method according to claim 38, wherein at least some of said heat energy is applied to said substrate prior to printing said pattern.

42. A method according to claim 38, wherein at least some of said heat energy is applied to said substrate subsequent to printing said pattern.

43. A method of printing on a glass substrate, comprising:
  ink jet printing a composition having 39-50wt % solids content, comprising a vehicle being a liquid at 15° C. and having sub-micron particles of binding composition and having viscosity below 20cps at jetting temperature onto the glass substrate to produce a pattern;
  fixing the pattern to the substrate by application of energy; and
  firing the substrate at a temperature above 500° C. and below 700° C. so that the composition becomes an integral part of the substrate.

* * * * *